(12) United States Patent
Kojima

(10) Patent No.: US 7,109,472 B2
(45) Date of Patent: Sep. 19, 2006

(54) SCALE FOR REFLECTIVE PHOTOELECTRIC ENCODER AND REFLECTIVE PHOTOELECTRIC ENCODER

(75) Inventor: Kenichi Kojima, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/078,355

(22) Filed: Mar. 14, 2005

(65) Prior Publication Data

US 2005/0211887 A1 Sep. 29, 2005

(30) Foreign Application Priority Data

Mar. 26, 2004 (JP) .............................. 2004-091344

(51) Int. Cl.
*G01D 5/36* (2006.01)
*G02B 27/44* (2006.01)

(52) U.S. Cl. .................. 250/237 G; 359/572; 359/576

(58) Field of Classification Search ..............................
250/231.1–231.18, 237 G; 359/572, 576, 359/571

See application file for complete search history.

(56) References Cited

U.S. PATENT DOCUMENTS

| 5,786,931 A | * | 7/1998 | Speckbacher et al. ...... 359/572 |
| 2001/0046055 A1 | | 11/2001 | Speckbacher et al. ...... 356/499 |
| 2004/0008416 A1 | * | 1/2004 | Okuno ........................ 359/566 |

FOREIGN PATENT DOCUMENTS

| DE | 196 52 563 A1 | | 6/1998 |
| DE | 100 25 694 A1 | | 3/2002 |
| EP | 0 752 599 A1 | | 1/1997 |
| JP | 2244002 | * | 9/1990 |
| JP | A 10-318793 | | 12/1998 |

* cited by examiner

*Primary Examiner*—Georgia Epps
*Assistant Examiner*—Brian J. Livedalen
(74) *Attorney, Agent, or Firm*—Oliff & Berridge PLC

(57) ABSTRACT

In a scale for a reflective photoelectric encoder in which a reflective film is not formed on the side faces of phase gratings, an edge angle θ of the phase grating is set larger than 80 degrees and less than 90 degrees. Accordingly, stable diffraction efficiency is obtained, even if there are variations in the shape and size of the gratings.

2 Claims, 3 Drawing Sheets

SCALE FOR REFLECTIVE PHOTOELECTRIC ENCODER AND REFLECTIVE PHOTOELECTRIC ENCODER

BACKGROUND OF THE INVENTION

1. Field of the Invention

The present invention relates to a scale for a reflective photoelectric encoder and a reflective photoelectric encoder. The present invention especially relates to a scale for a reflective photoelectric encoder in which a reflective film is not formed on the side faces of phase gratings (hereinafter simply called gratings), and which can stably obtain high diffraction efficiency and allow variations in the shape and size of the gratings caused by processing, even if there are processing variations in the shape and size of the gratings. The present invention also relates to a reflective photoelectric encoder using such a scale.

2. Description of the Related Art

In a scale for a reflective photoelectric encoder, as shown in FIG. 1, many gratings 12 are arranged at predetermined intervals (pitch) p in parallel in a direction orthogonal to the surface of a paper in a longitudinal direction (a lateral direction of the drawing) of a substrate 10.

Diffraction efficiency being an index of signal intensity of a photoelectric encoder using such a scale depends on the shape and size of the gratings (grating width l, grating height h, and edge angle θ). However, variations occur in the shape and size of the gratings (variations in the grating width Δl=approximately 40 nm, variations in the grating height Δh=approximately 10 nm, and variations in the edge angle Δθ=approximately 5 degrees) in processing the scale. Especially in a long scale, it is difficult to uniformly process the shape and size of the gratings over a wide area. There are cases where variations in the shape and size of the gratings cause variations in the diffraction efficiency. At that time, it is difficult to obtain stable high diffraction efficiency.

To solve such a problem, as shown in FIG. 2, Japanese Patent Laid-Open Publication No. Hei 10-318793 discloses that an edge angle θ should be set at 70 degrees±10 degrees, when a scale is combined with a p-polarized light source of λ=670 μm. In the scale, a conductive metal film, especially being a reflective film 14 made of chromium, is formed on the whole surface of gratings 12 of l=256 to 384 nm and h=160 to 210 nm made of a dielectric material such as silicon dioxide, titanium dioxide, tantalum pentoxide, aluminum oxide, or the like.

However, a scale in which a reflective film was not formed on the side faces of gratings 12, as shown in FIG. 3 contrasted with FIG. 2, could not necessarily obtain stable diffraction efficiency depending on a particular width or shape of gratings.

Especially in Japanese Patent Laid-Open Publication No. Hei 10-318793, the gratings 12 are made of silicon with (110). Thus, if the gratings are formed by general anisotropic wet etching, an edge angle is approximately 70 degrees. However, there was a problem that high diffraction efficiency could not be obtained with such an angle.

SUMMARY OF THE INVENTION

In view of the foregoing problems, various exemplary embodiments of this invention provide a scale for a reflective photoelectric encoder with stable high diffraction efficiency, even if a reflective film is not formed on the side faces of gratings in the scale.

A scale for a reflective photoelectric encoder according to various exemplary embodiments of this invention has no reflective film formed on the side faces of gratings and an edge angle of the grating which is set larger than 80 degrees and less than 90 degrees, thereby solving the foregoing problems.

A scale for a reflective photoelectric encoder according to various exemplary embodiments of this invention comprises: a substrate; a first reflective film uniformly deposited on the substrate; a grating formed on the substrate, the grating being made of a material the reflectance of which is different from that of the first reflective film; and a second reflective film formed on a top end of the grating, the second reflective film being made of the same material as the first reflective film. In the scale for the reflective photoelectric encoder, an edge angle of the grating is set larger than 80 degrees and less than 90 degrees, thereby solving the foregoing problems.

The various exemplary embodiments of this invention also provide a reflective photoelectric encoder which is provided with the foregoing scale.

According to the various exemplary embodiments of the present invention, in a scale for a reflective photoelectric encoder in which a reflective film is not formed on the side faces of gratings, if there are variations in the shape and size of the gratings, it is possible to obtain stable high diffraction efficiency, and to allow the variations in the shape and size of the gratings by processing. Accordingly, it is possible to realize a scale for a reflective photoelectric encoder with stable high diffraction efficiency.

BRIEF DESCRIPTION OF THE DRAWINGS

The above object, features, and advantages of the present invention, as well as other objects and advantages thereof, will become more apparent from the description of the invention which follows, taken in conjunction with the accompanying drawings, wherein like reference characters designate the same or similar parts and wherein.

DETAILED DESCRIPTION OF THE PREFERRED EMBODIMENTS

The present invention is based on experiments conducted by the inventors.

Figure 1:
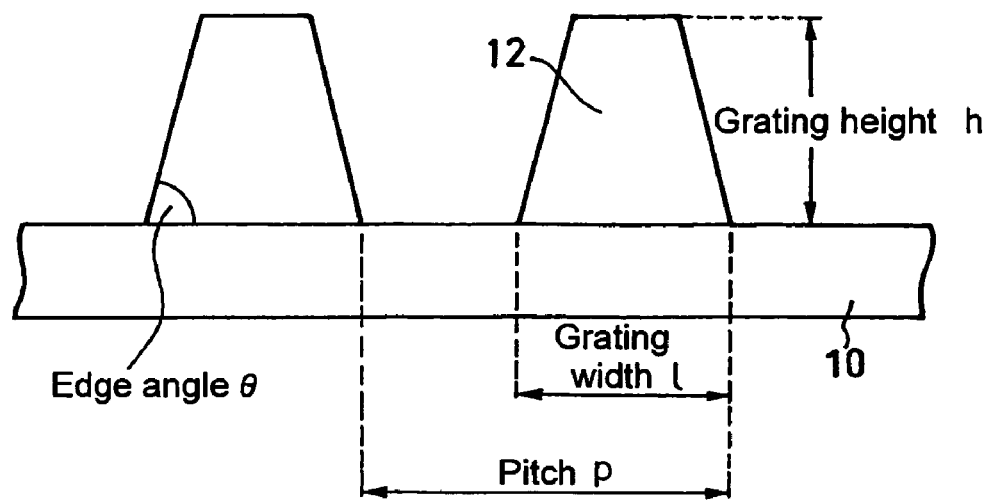
FIG. 1 is a sectional view showing the general shape of gratings of a scale for a reflective photoelectric encoder.
Figure 2:
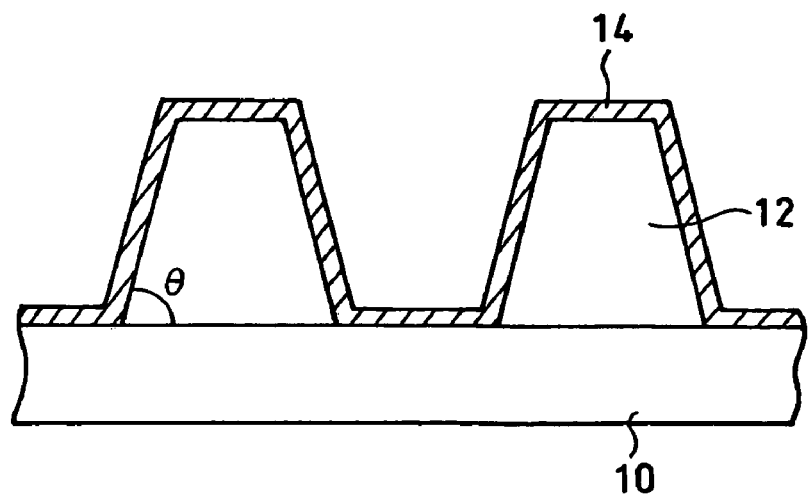
FIG. 2 is a sectional view showing the shape of gratings of a scale to which Japanese Patent Laid-Open Publication No. 10-318793 is applicable.
Figure 3:
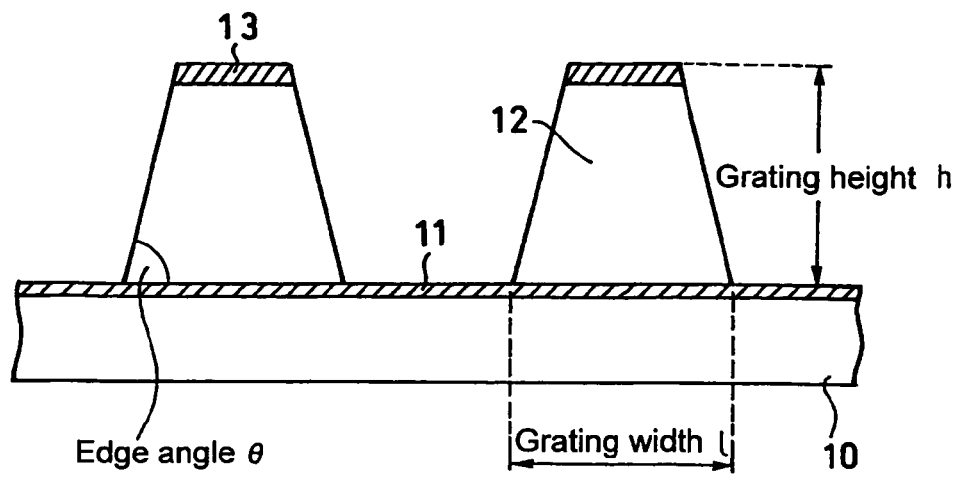
FIG. 3 is a sectional view showing the shape of gratings of a scale to which the present invention is applicable.
Figure 4:
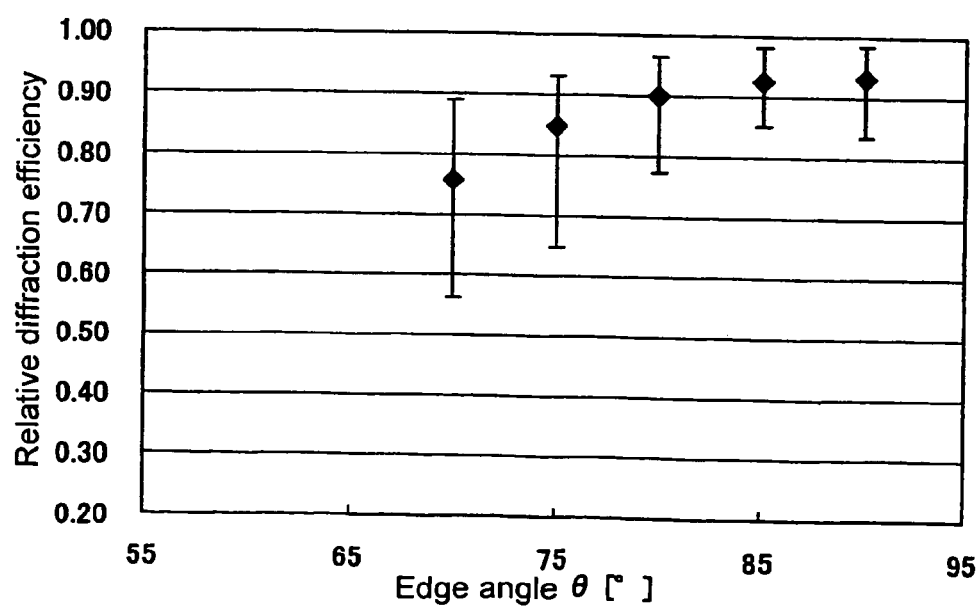
FIG. 4 is a graph showing the results of simulating the optimal shape of the grating according to the present invention.

The inventors examined the robust shape and size of a grating which can obtain high diffraction efficiency with respect to variations in the shape and size of the grating by use of a commercial diffraction effect simulator program (trade name: GSOLVER by Grating Solver Development Co.). In other words, as shown in FIG. 3, a first reflective film 11 made of chromium is deposited onto the surface of a glass substrate 10, and a second reflective film 13 made of chromium is deposited only onto the top faces of gratings 12 made of tungsten in a scale. In the grating 12, the ratio l/p between the grating width l and the pitch p is 0.40 to 0.58, and the grating height h is 110 to 160 nm. FIG. 4 shows the relationship between the edge angle θ and the fluctuation in diffraction efficiency according to simulation results in the case where a p-polarized light source of a wavelength λ=633 nm is used.

It is apparent from FIG. 4 that relative diffraction efficiency is high, and the fluctuation is small at 90 degrees and 80 degrees. To make the edge angle θ at 90 degrees, however, it is necessary to increase the amount of over etching by increasing etching time or etching ion energy, in dry etching processing. Thus, it is necessary to increase resistance to plasma of an etching mask, so that processing is difficult. When the edge angle θ is smaller than or equal to 80 degrees, on the other hand, processing is easy, but the fluctuation in the relative diffraction efficiency is sensitively affected by the variations in the grating width l and the grating height h. Accordingly, the optimal edge angle is 80 degrees <θ<90 degrees.

Figure 5:
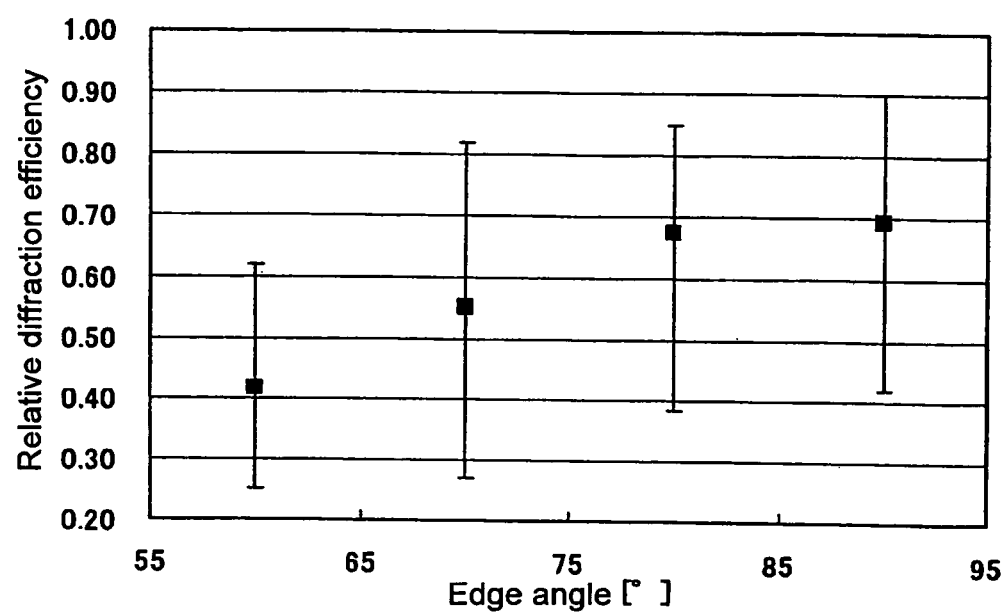
FIG. 5 is a graph showing simulation results according to a conventional example disclosed in Japanese Patent Laid-Open Publication No. 10-318793.

For the purpose of comparison, FIG. 5 shows the relationship between the edge angle θ and the fluctuation in the diffraction efficiency according to simulation results in a conventional example disclosed in Japanese Patent Laid-Open Publication No. Hei 10-318793. In the conventional example, as in the case shown in FIG. 4, a p-polarized light source of a wavelength λ=633 nm is used with respect to a scale which has the ratio l/p between the grating width l and the pitch p of 0.40 to 0.58, and the grating height h of 110 to 160 nm.

In the foregoing simulation, the ratio l/p between the grating width l and the pitch p is 0.40 to 0.58, the grating height h is 110 to 160 nm, and the p-polarized light source of the wavelength λ=633 nm is used. However, the present invention is applicable to a general scale in which a reflective film is not formed on the side faces of gratings.

The disclosure of Japanese Patent Application No. 2004-91344 filed Mar. 26, 2004 including specification, drawings and claims is incorporated herein by reference in its entirety.

Although certain preferred embodiments have been shown and described, it should be understood that many changes and modifications may be made therein without departing from the scope of the appended claims.

What is claimed is:

1. A scale for reflective photoelectric encoder having no reflective film formed on side faces of phase gratings, comprising:
   a substrate;
   a first reflective film uniformly deposited on the substrate;
   the phase gratings, which are formed on the substrate and which have a reflectance different from that of the first reflective film; and
   a second reflective film formed on a top end of the phase gratings, the second reflective film being made of the same material as the first reflective film;
   wherein:
   the phase gratings are made of tungsten; and
   an edge angle of the phase grating is set larger than 80 degrees and less than 90 degrees.

2. A reflective photoelectric encoder comprising a scale having no reflective film formed on side faces of phase gratings, wherein
   the scale comprises:
      a substrate;
      a first reflective film uniformly deposited on the substrate;
      the phase gratings, which are formed on the substrate and which have reflectance different from that of the first reflective film; and
      a second reflective film formed on a top end of the phase gratings, the second reflective film being made of the same material as the first reflective film; and
   wherein the phase gratings are made of tungsten; and an edge angle of the phase grating is set larger than 80 degrees and less than 90 degrees.

* * * * *